US012548902B2

(12) United States Patent
Zhang et al.

(10) Patent No.: US 12,548,902 B2
(45) Date of Patent: Feb. 10, 2026

(54) PHASE SHIFTER, ANTENNA, AND ELECTRONIC DEVICE

(71) Applicant: BOE Technology Group Co., Ltd., Beijing (CN)

(72) Inventors: Shiqiao Zhang, Beijing (CN); Jia Fang, Beijing (CN); Feng Qu, Beijing (CN); Yang Zheng, Beijing (CN); Cheng Pan, Beijing (CN); Yu Luo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 73 days.

(21) Appl. No.: 18/686,980

(22) PCT Filed: Jan. 11, 2023

(86) PCT No.: PCT/CN2023/071804
§ 371 (c)(1),
(2) Date: Feb. 27, 2024

(87) PCT Pub. No.: WO2024/148538
PCT Pub. Date: Jul. 18, 2024

(65) Prior Publication Data
US 2024/0429604 A1 Dec. 26, 2024

(51) Int. Cl.
*H01P 1/18* (2006.01)
*H01Q 5/307* (2015.01)

(52) U.S. Cl.
CPC ............... *H01Q 5/307* (2015.01); *H01P 1/18* (2013.01)

(58) Field of Classification Search
CPC .. H01Q 5/307; H01Q 3/36; H01P 1/18; H01P 1/184
See application file for complete search history.

(56) References Cited

U.S. PATENT DOCUMENTS

2014/0287704 A1* 9/2014 Dupuy .................... H04B 1/18 455/114.2
2023/0098813 A1 3/2023 Fang et al.

FOREIGN PATENT DOCUMENTS

CN 101272006 A 9/2008
CN 104103876 A 10/2014
CN 105552485 A 5/2016
CN 113451718 A 9/2021

(Continued)

*Primary Examiner* — David E Lotter
(74) *Attorney, Agent, or Firm* — WHDA, LLP

(57) ABSTRACT

The disclosure provides a phase shifter, an antenna, and an electronic device, wherein the phase shifter includes: a first substrate and a second substrate which are oppositely disposed as well as a plurality of phase shifting units disposed between the first substrate and the second substrate, wherein each of the phase shifting units includes a right-handed microstrip unit, the plurality of the right-handed microstrip units are arranged in a first direction to form a right-handed microstrip line, each of the phase shifting units includes a left-handed microstrip unit connected in series to the corresponding right-handed microstrip unit, and the plurality of right-handed microstrip units and the plurality of left-handed microstrip units form a combined left-handed and right-handed transmission line. A functional design of combining a right transmission line with a left transmission line is achieved, and a miniaturization design of the phase shifter is ensured.

19 Claims, 14 Drawing Sheets

(56) References Cited

FOREIGN PATENT DOCUMENTS

| | | | |
|---|---|---|---|
| CN | 114830433 | A | 7/2022 |
| CN | 115312998 | A | 11/2022 |
| KR | 20140005739 | A | 1/2014 |
| WO | 2019244244 | A1 | 12/2019 |

* cited by examiner

PHASE SHIFTER, ANTENNA, AND ELECTRONIC DEVICE

TECHNICAL FIELD

The disclosure relates to the technical field of communication, in particular to a phase shifter, an antenna, and an electronic device.

BACKGROUND

With the rapid development of science and technology, requirements of people for a wireless communication technology are getting higher and higher. The performance of a wireless communication device not only needs to satisfies the use needs of users, but also needs to be more miniaturized, thinned and integrated. A phase shifter is used as an important core component of a phased array antenna, a typical phased array is composed of thousands of antenna units connected to the phase shifter, and a miniaturized, flexible and lightweight phase shifter is essential for the phased array antenna. A transmission line adopted currently is generally a right-handed transmission line, i.e., a transmission line of which an electric field, a magnetic field and a wave vector follow a right-hand rule. A phase of an output end of the right-handed transmission line lags behind a phase of an input end thereof, that is, a phase generated by a transmission line with a quarter wavelength is negative ninety degrees. Thus, it is not beneficial to the miniaturization and integration designs of a microwave device.

SUMMARY

The disclosure provides a phase shifter, an antenna, and an electronic device for achieving a functional design of combining a right transmission line with a left transmission line, and ensuring a miniaturization design of the phase shifter.

In a first aspect, the embodiments of the present application disclose a phase shifter comprising:

a first substrate and a second substrate which are disposed opposite to each other, and a plurality of phase shifting units disposed between the first substrate and the second substrate, wherein each of the phase shifting units comprises a right-handed microstrip unit, the plurality of right-handed microstrip units are arranged in a first direction to form a right-handed microstrip line, each of the phase shifting units comprises a left-handed microstrip unit connected in series to the corresponding right-handed microstrip unit, and the plurality of right-handed microstrip units and the plurality of left-handed microstrip units form a combined left-handed and right-handed transmission line.

In a possible implementation, each of the left-handed microstrip units comprises a left-handed series capacitor connected in series to the corresponding right-handed microstrip unit and a left-handed parallel inductor connected in parallel to the left-handed series capacitor.

In a possible implementation, the phase shifter further comprises a third substrate located between the first substrate and the second substrate, each of the left-handed series capacitors comprises a first electrode located on a side, close to the third substrate, of the first substrate and a second electrode located on a side, away from the first substrate, of the third substrate, and orthographic projections of the first electrode and the second electrode on the third substrate at least partially overlap.

In a possible implementation, the side of the first substrate which is close to the third substrate is further provided with a third electrode adjacent to the first electrode, and the third electrode is connected to the second electrode through a via hole passing through the right-handed microstrip unit corresponding to the second electrode.

In a possible implementation, an orthographic projection of each of the second electrode and the right-handed microstrip unit corresponding to the second electrode on the third substrate comprises a first sub-part, a second sub-part and a third sub-part connected in sequence, the first sub-part and the third sub-part are disposed to extend in the first direction, and the second sub-part extends in a second direction intersected with the first direction.

In a possible implementation, each of the left-handed parallel inductors comprises a bending line connected to the second electrode and extending in the second direction intersected with the first direction, and an orthographic projection of the bending line on the second substrate is nonlinear.

In a possible implementation, the orthographic projection of the bending line on the second substrate comprises at least one rectangular unit repeatedly disposed.

In a possible implementation, the orthographic projection of the bending line on the second substrate comprises a first strip-shaped structure, a second strip-shaped structure, a third strip-shaped structure, a fourth strip-shaped structure and a fifth strip-shaped structure connected in sequence, and a "6"-shaped structure is enclosed by the first strip-shaped structure, the second strip-shaped structure, the third strip-shaped structure, the fourth strip-shaped structure, and the fifth strip-shaped structure.

In a possible implementation, the orthographic projection of the bending line on the second substrate comprises at least one circle of annular structure spirally disposed.

In a possible implementation, the phase shifter further comprises a grounding electrode located on a side, close to the third substrate, of the second substrate, and orthographic projections of the first electrode and the second electrode on the second substrate completely fall within a range of an orthographic projection of the grounding electrode on the second substrate.

In a possible implementation, each of the right-handed microstrip units comprises a right-handed series inductor connected in series to the corresponding left-handed microstrip unit and a right-handed parallel capacitor connected in parallel to the right-handed series inductor, wherein the right-handed series inductor is connected in series to the left-handed series capacitor, and the right-handed parallel capacitor is connected in parallel to the left-handed parallel inductor.

In a possible implementation, an adjustable medium layer is further disposed between the second electrode and the grounding electrode, each of the right-handed parallel capacitors consists of the corresponding second electrode, the adjustable medium layer, and the grounding electrode, and each of the right-handed series inductors consists of the corresponding right-handed microstrip unit.

In a second aspect, the embodiments of the present application disclose an antenna, wherein the antenna comprises:

the phase shifter above as well as a feeding unit and a radiation unit which are respectively coupled to the phase shifter; and the feeding unit is configured to couple a received radio frequency signal to the phase shifter, the phase shifter is configured to perform phase shifting on the radio frequency signal to obtain a phase-shifted signal and couple the phase-shifted signal to the radiation unit so that an electromagnetic wave signal corresponding to the phase-shifted signal is radiated by the radiation unit.

In a third aspect, the embodiments of the present application disclose an electronic device, wherein the electronic device comprises:

the arrayed antenna above.

DETAILED DESCRIPTION OF THE EMBODIMENTS

Figure 1:
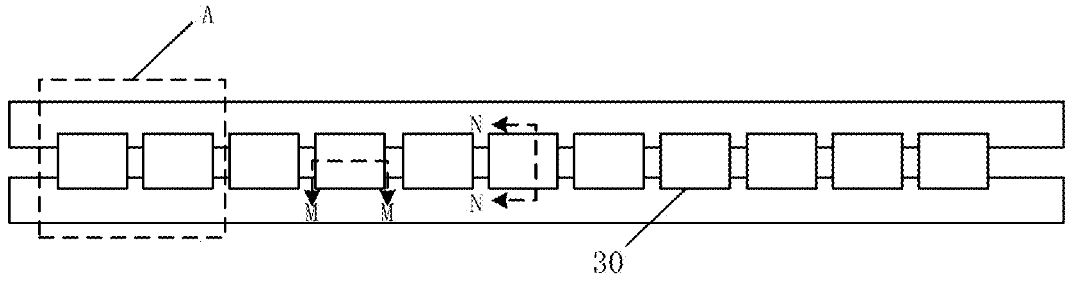
FIG. 1 is a schematic view of one of plane distributions of a phase shifter provided in an embodiment of the disclosure.

In order to make objectives, technical solutions and advantages of the embodiments of the disclosure clearer, the technical solutions in the embodiments of the disclosure will be described clearly and completely below in conjunction with accompanying drawings in the embodiments of the disclosure. Obviously, the described embodiments are a part of the embodiments of the disclosure, not all the embodiments. Furthermore, the embodiments in the disclosure and features in the embodiments may be combined with each other without conflicts. Based on the described embodiments of the disclosure, all other embodiments obtained by those of ordinary skill in the art without creative work shall fall within the protective scope of the disclosure.

Unless otherwise defined, technical terms or scientific terms used in the disclosure shall be ordinary meanings as understood by those of ordinary skill in the art to which the disclosure belongs. The word "including" or "includes" or the like means that the element or object preceding the word covers the element or object listed after the word and its equivalent, without excluding other elements or objects.

It should be noted that the sizes and shapes of all patterns in the accompanying drawings do not reflect real scales, and are merely to illustrate contents of the disclosure. Furthermore, same or similar numerals throughout indicate same or similar elements or elements with same or similar functions.

In the related art, a right-handed transmission line, i.e., an ordinary microstrip line is usually adopted, wherein a phase on an output end of the right-handed transmission line lags behind a phase on an input end of the right-handed transmission line, that is, a phase angle generated by a segment of transmission line with a quarter wavelength is negative ninety degrees. In contrast, the left-handed transmission line is just the opposite, a phase on an output end of the left-handed transmission line is advanced as comparison with a phase on an input end of the left-handed transmission line, that is, a phase angle generated by a segment of transmission line with a quarter wavelength is positive ninety degrees. In this case, if a phase shifting angle which is negative two hundred and seventy degrees is desired to be achieved by the right-handed transmission line, a transmission line with a three-quarter wavelength is needed; and if a phase shifting angle which is negative two hundred and seventy degrees is desired to be achieved by the left-handed transmission line, a transmission line with a quarter wavelength is only needed. It can be seen that how to ensure the miniaturization design of a phase shifter has become a technical problem to be urgently solved.

In view of this, an embodiment of the disclosure provides a phase shifter, an antenna, and an electronic device, by which a functional design of combining a right transmission line with a left transmission line is achieved, and a miniaturization design of the phase shifter is ensured.

Figure 2:
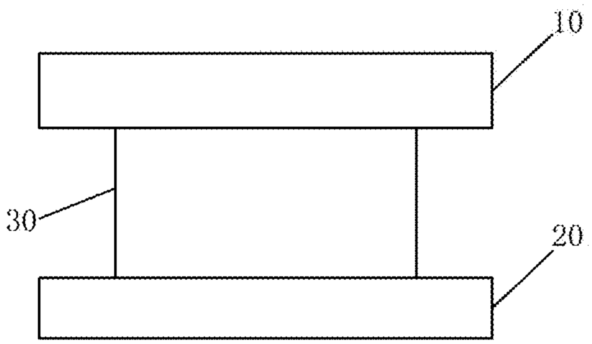
FIG. 2 is a schematic view of one of sectional structures in a direction shown as MM in FIG. 1.
Figure 3:
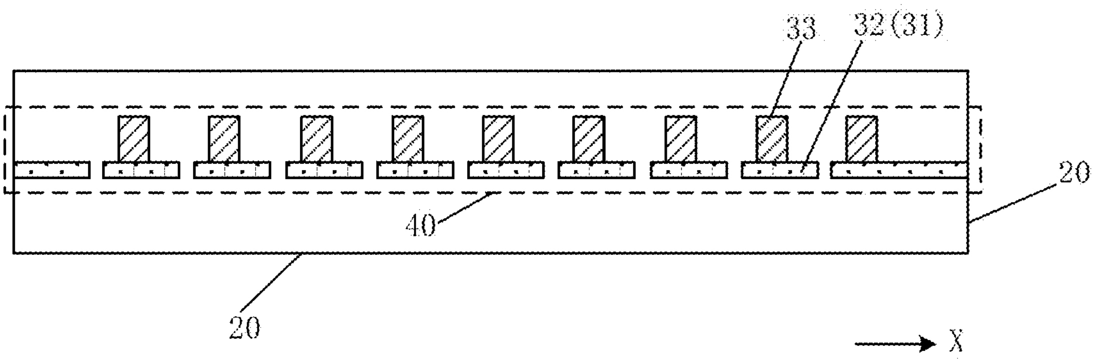
FIG. 3 is a schematic view of one of top-view structures that a left-handed transmission line and a right-handed transmission line are combined on a second substrate in a phase shifting unit in a phase shifter provided in an embodiment of the disclosure.

As shown in FIG. 1 to FIG. 3, FIG. 1 is a schematic view of one of plane distributions of a phase shifter provided in an embodiment of the disclosure, FIG. 2 is a schematic view of one of sectional structures in a direction shown as MM in FIG. 1, and FIG. 3 is a schematic view of one of top-view structures that a combined left-handed and right-handed transmission line 40 in a phase shifting unit 30 on a second substrate 20. The phase shifter includes:

a first substrate 10 and a second substrate 20 which are disposed opposite to each other; a plurality of phase shifting units 30 disposed between the first substrate 10 and the second substrate 20, wherein each of the phase shifting units 30 includes a right-handed microstrip unit 32, the plurality of right-handed microstrip units 32 are arranged in a first direction to form a right-handed microstrip line 31, each of the phase shifting units 30 includes a left-handed microstrip unit 33 connected in series to the corresponding right-handed microstrip unit 32, and the plurality of right-handed microstrip units 32 and the plurality of left-handed microstrip units 33 form a combined left-handed and right-handed transmission line 40.

During specific implementation, the phase shifter provided in the embodiment of the disclosure includes the first substrate 10 and the second substrate 20 which are disposed opposite to each other, and the plurality of phase shifting units 30 disposed between the first substrate 10 and the second substrate 20, wherein the first substrate 10 and the second substrate 20 may be glass substrates, polyimide (PI), liquid crystal polymers (LCP), printed circuit boards (PCB), or ceramics, etc. Of course, the first substrate 10 and the second substrate 20 can be set according to actual application demands, and are not limited herein. In addition, the plurality of phase shifting units 30 disposed between the first substrate 10 and the second substrate 20 may be arranged in a linear array. The specific quantity of the plurality of phase shifting units 30 can be set according to actual application demands and is not specifically limited herein. FIG. 1 shows a situation that there are eleven phase shifting units 30 which are not merely limited thereto.

During specific implementation, each of the phase shifting units 30 includes a right-handed microstrip unit 32, the plurality of right-handed microstrip units 32 are arranged in a first direction to form a right-handed microstrip line 31. Moreover, each of the right-handed microstrip units 32 correspond to the corresponding phase shifting units 30. As shown in FIG. 1, a direction indicated by arrow X is the first direction, each of the right-handed microstrip units 32 is independently disposed, and accordingly, every two adjacent right-handed microstrip units 32 are spaced from each other for a preset distance; and in one of exemplary embodiments, each of the right-handed microstrip units 32 may be equidistantly disposed. In addition, the quantity of the plurality of right-handed microstrip units 32 can be set according to actual application demands, and is not limited herein. Moreover, each of the phase shifting units 30 includes a left-handed microstrip unit 33 connected in series to the corresponding right-handed microstrip unit 32, and accordingly, the phase shifter includes a plurality of left-handed microstrip units 33. Thus, the plurality of right-handed microstrip units 32 and the plurality of left-handed microstrip units 33 form the combined left-handed and right-handed transmission line 40. That is to say, the combined left-handed and right-handed transmission line 40 has characteristics of a left-handed transmission line and a right-handed transmission line at the same time. Compared with a conventional right-handed transmission line, the combined right-handed and left-handed transmission line 40 achieves the combination of the left-handed transmission line, which has certain advantages in the miniaturization design of a microwave device, thereby ensuring the miniaturization and integration designs of the phase shifter.

It should be noted that, in the embodiment of the disclosure, an electric field, a magnetic field and a wave vector of each of the right-handed microstrip units 32 follow a right-hand rule, and accordingly, the phase of the output end lags behind the phase of the input end. An electric field, a magnetic field and a wave vector of each of the left-handed microstrip units 32 follow a left-hand rule, and accordingly, the phase of the output end is advanced as comparison with the phase of the input end.

Figure 4:
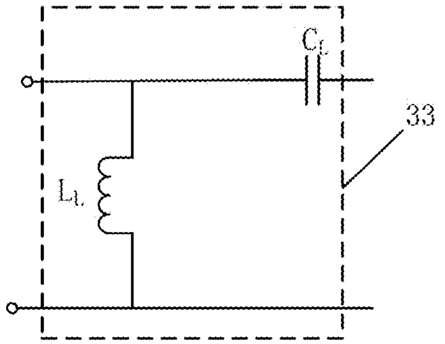
FIG. 4 is a schematic view of one of equivalent circuits of a left-handed microstrip unit in a phase shifter provided in an embodiment of the disclosure.

In the embodiment of the disclosure, as shown in FIG. 4, each of the left-handed microstrip units 33 includes a left-handed series capacitor $C_L$ connected in series to the corresponding right-handed microstrip unit 32 and a left-handed parallel inductor $L_L$ connected in parallel to the left-handed series capacitor $C_L$.

As further shown in FIG. 4 which is a view of an equivalent circuit of each of the left-handed microstrip units 33, specifically speaking, each of the left-handed microstrip units 33 includes the left-handed series capacitor $C_L$ and the left-handed parallel inductor $L_L$ connected in parallel to the left-handed series capacitor $C_L$. Each of the left-handed microstrip units 33 is connected in series to the corresponding right-handed microstrip unit 32. Specific quantities of the left-handed series capacitors $C_L$ and the left-handed parallel inductors $L_L$ can be set according to actual application demands, and are not limited herein.

Figure 5:
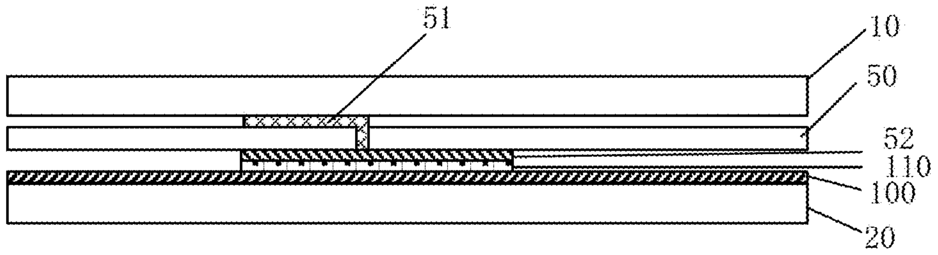
FIG. 5 is a schematic view of one of sectional structures in a direction shown as NN in FIG. 1.

In the embodiment of the disclosure, as shown in FIG. 5 which is a schematic view of one of sectional structures in a direction shown as NN in FIG. 1, specifically speaking, the phase shifter further includes a third substrate 50 located between the first substrate 10 and the second substrate 20, each of the left-handed series capacitors $C_L$ includes a first electrode 51 located on a side, close to the third substrate 50, of the first substrate 10 and a second electrode 52 located on a side, away from the first substrate 10, of the third substrate 50, and orthographic projections of the first electrode 51 and the second electrode 52 on the third substrate 50 at least partially overlap.

During specific implementation, as further shown in FIG. 5, the phase shifter further includes the third substrate 50 located between the first substrate 10 and the second substrate 20, and the third substrate 50 may be a glass substrate, PI, an LCP, a PCB or ceramics, etc. Of course, the third substrate 50 can be further set according to actual application demands, and is not limited herein. In addition, each of the left-handed series capacitors $C_L$ includes the first electrode 51 located on the side of the first substrate 10 which is close to the third substrate 50 and the second electrode 52 located on the side, away from the first substrate 10, of the third substrate 50, and the orthographic projections of the first electrode 51 and the second electrode 52 on the third substrate 50 at least partially overlap. Thus, the corresponding left-handed series capacitor $C_L$ is formed by the first electrode 51 and the second electrode 52 which at least partially overlap. In one of exemplary embodiments, each of the first electrodes 51 may be periodically disposed on a surface of the side of the first substrate 10 which is close to the third substrate 50.

In the embodiment of the disclosure, the side of the first substrate 10 which is close to the third substrate 50 is further provided with a third electrode 53 adjacent to the first electrode 51, and the third electrode 53 is connected to the second electrode 52 through a via hole H passing through the right-handed microstrip unit 32 corresponding to the second electrode 52.

Figure 6:
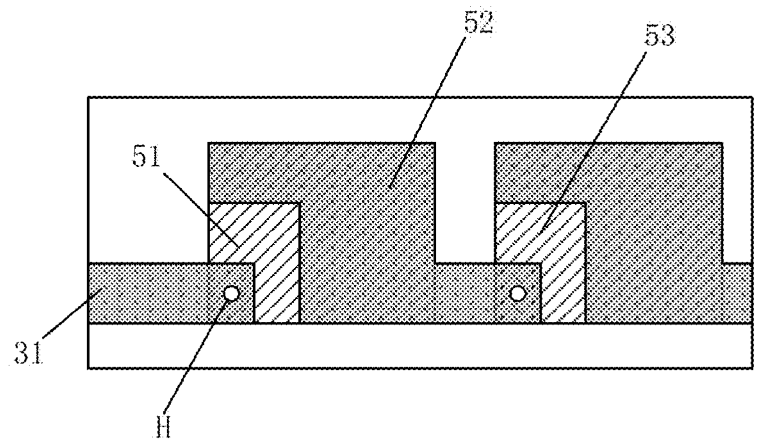
FIG. 6 is a schematic view of one of laminated structures in area A in FIG. 1.

During specific implementation, as shown in FIG. 6 which is a schematic view of one of laminated structures of single phase shifting unit 30 in the phase shifter, specifically speaking, the side of the first substrate 10 which is close to the third substrate 50 is further provided with the third electrode 53 adjacent to the first electrode 51, and the third electrode 53 is connected to the second electrode 52 through the via hole H passing through the right-handed microstrip unit 32 corresponding to the second electrode 52. It should be noted that FIG. 6 is a schematic view of one of laminated structures in area A in FIG. 1. The mentioned via hole H is actually a metalized via hole H, and in one of exemplary embodiments, it may be of a structure with an inner wall to which a metal film layer is attached; and in one of exemplary embodiments, it may be of a structure in which a metal material is filled. In addition, the via hole H passes through the third substrate 50.

It should be noted that the first substrate 10, the second substrate 20 and the third substrate 50 may be a PCB insulation board such as a polytetrafluoroethylene glass fiber laminated board, a phenolic paper laminated board, and a phenolic glass cloth laminated board, and may be further made of a rigid material, such as quartz and glass, with lower microwave loss.

Figure 7:
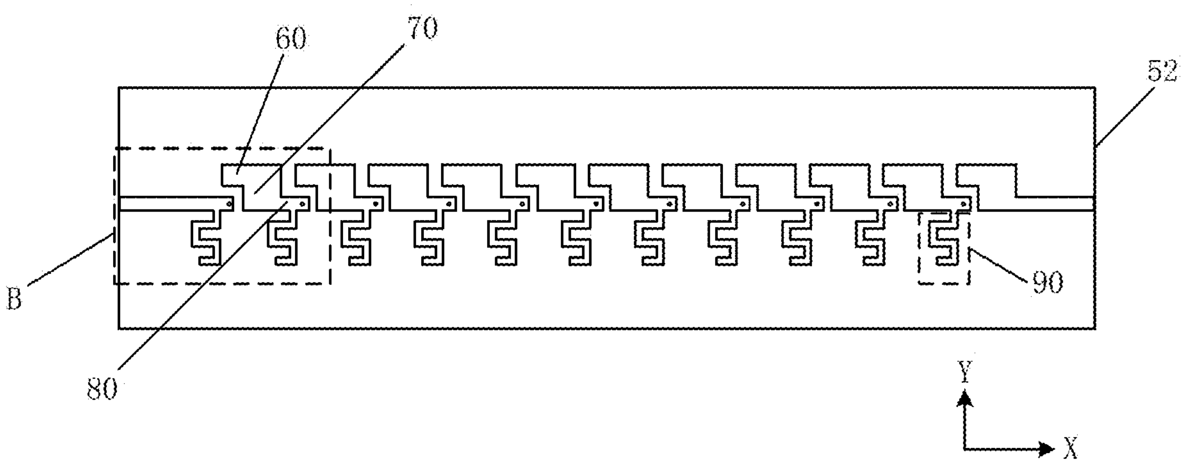
FIG. 7 is a schematic view of one of top-view structures that a second electrode and a right-handed microstrip unit corresponding to the second electrode are located on a third substrate in a phase shifter provided in an embodiment of the disclosure.

In the embodiment of the disclosure, as shown in FIG. 7 which is a schematic view of one of top-view structures that the second electrode 52 and the right-handed microstrip unit 32 corresponding to the second electrode 52 are located on the third substrate 50, specifically speaking, an orthographic projection of each of the second electrode 52 and the right-handed microstrip unit 32 corresponding to the second electrode 52 on the third substrate 50 includes a first sub-part 60, a second sub-part 70 and a third sub-part 80 connected in sequence, the first sub-part 60 and the third sub-part 80 extend in the first direction, and the second sub-part 70 extends in a second direction intersected with the first direction.

Figure 8:
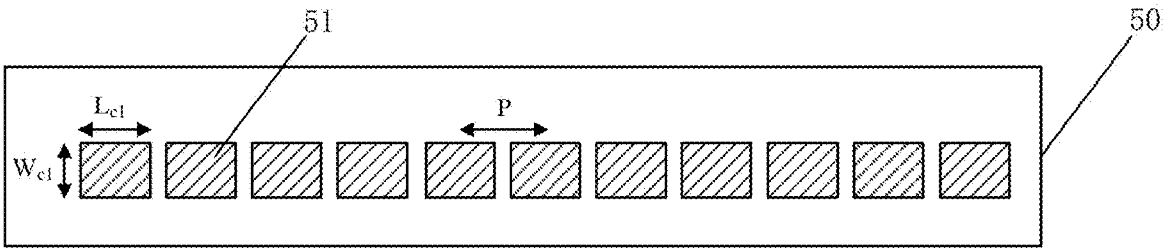
FIG. 8 is a schematic view of one of top-view structures that a first electrode is located on a third substrate in a phase shifter provided in an embodiment of the disclosure.

As further shown in FIG. 7, the orthographic projection of each of the second electrode 52 and the right-handed microstrip unit 32 corresponding to the second electrode 52 on the third substrate 50 includes the first sub-part 60, the second sub-part 70 and the third sub-part 80 connected in sequence, wherein the first sub-part 60 and the third sub-part 80 extend in the first direction, and the second sub-part 70 extends in the second direction intersected with the first direction. A direction indicated by arrow Y is the second direction. In one of exemplary embodiments, the first sub-part 60, the second sub-part 70 and the third sub-part 80 are arranged to be shaped like "Z", and an orthographic projection of the first electrode 51 on the third substrate 50 is rectangular. As shown in FIG. 8 which is a schematic view of one of top-view structures that the first electrode 51 is located on the third substrate 50, wherein $L_{c1}$ represents a length of a rectangle corresponding to the first electrode 51, $W_{c1}$ represents a width of the rectangle corresponding to the first electrode 51, and P represents a distance between central points of two adjacent first electrodes 51. In one of exemplary embodiments, $L_{c1}$ may be one eighth of a wavelength of a medium with the highest frequency in a working frequency band of the phase shifter, $W_{c1}$ may be one tenth of the wavelength of the medium with the highest frequency in the working frequency band, and P may be a quarter of the wavelength of the medium with the highest frequency in the working frequency band.

Figure 9:
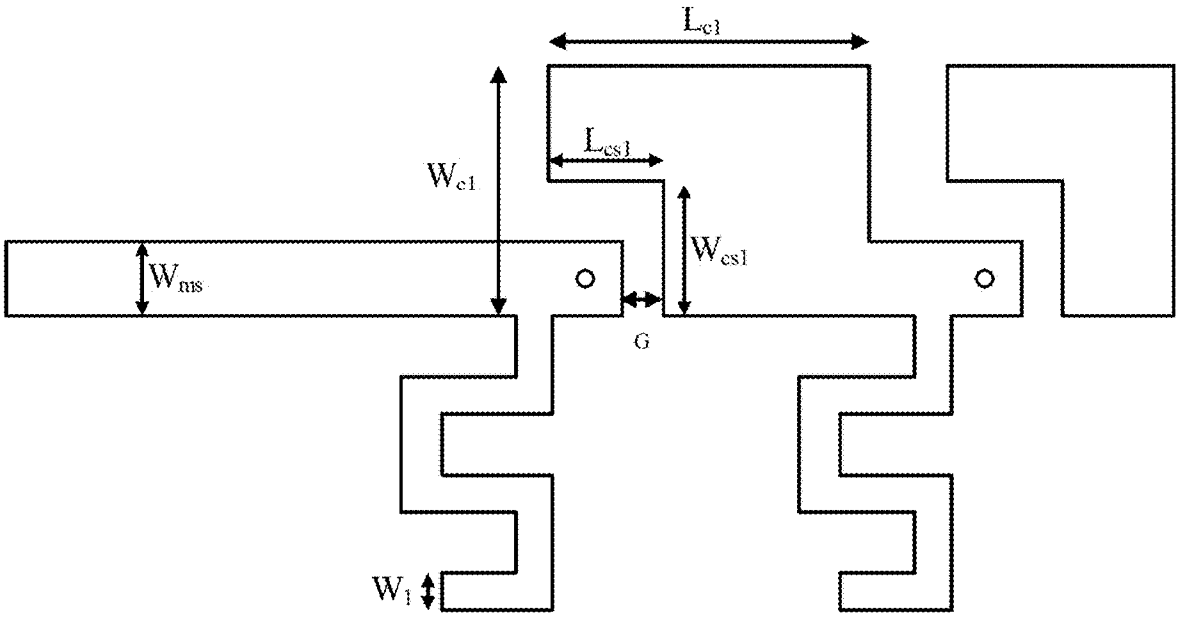
FIG. 9 is an enlarged view of one of structures in area B in FIG. 7.

As shown in FIG. 9 which is an enlarged view of one of structures in area B in FIG. 7, wherein $W_{ms}$ represents a width of the right-handed microstrip line 31, a specific width thereof may be a width of a fifty-ohmage impedance corresponding to the highest frequency in the working frequency band, a specific value thereof may be determined by means of impedance calculation software, and detailed descriptions thereof will be omitted herein. As further shown in FIG. 9, $L_{cs1}$ represents an extension length of the first sub-part 60 in the first direction, and a specific value thereof may be one thirtieth of the wavelength of the medium with the highest frequency in the working frequency band; $W_{cs1}$ represents an extension length of the second sub-part 70 in the second direction, and a specific value thereof may be one thirty-fifth of the wavelength of the medium with the highest frequency in the working frequency band; and G represents a spacing between every two adjacent right-handed microstrip units, and a length of G may be one sixtieth of the wavelength of the medium with the highest frequency in the working frequency band. Of course, specific values of relevant structural parameters can be further set according to actual application demands, and detailed descriptions thereof will be omitted herein. In addition, It should be noted that the aforementioned via hole H may be formed in a tail end of the third sub-part 80.

In the embodiment of the disclosure, as further shown in FIG. 7, each of the left-handed parallel inductors $L_L$ includes a bending line 90 connected to the second electrode 52 and extending in the second direction intersected with the first direction, and an orthographic projection of the bending line 90 on the second substrate 20 is nonlinear.

During specific implementation, each of the left-handed parallel inductors $L_L$ includes the bending line 90 connected to the second electrode 52 and extending in the second direction intersected with the first direction, accordingly, the phase shifter includes a plurality of bending lines 90, and each of the bending lines 90 forms the corresponding left-handed parallel inductor $L_L$. Moreover, the orthographic projection of the bending line 90 on the second substrate 20 is nonlinear.

It should be noted that, in one of exemplary embodiments, the second electrode 52, the right-handed microstrip unit 32 corresponding to the second electrode 52 and the bending line 90 may be of a structure made on the same layer or an integrally formed structure, thereby simplifying a manufacturing process.

In the embodiment of the disclosure, setting ways of the bending line 90 may be shown as follows, but are not limited to the following setting ways.

Figure 23:
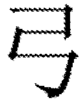
FIG. 23 shows the shape of the orthographic projection of the bending line on the second substrate which is Chinese character.

In one of exemplary embodiments, as further shown in FIG. 9, the orthographic projection of the bending line 90 on the second substrate 20 includes at least one rectangular unit repeatedly disposed. Accordingly, the orthographic projection of the bending line 90 on the second substrate 20 is disposed to be shaped like a Chinese character shown in FIG. 23, which can effectively increase an inductance of the corresponding left-handed parallel inductor $L_L$ and is beneficial to the ensuring of the miniaturization design of the phase shifter.

Figure 10:
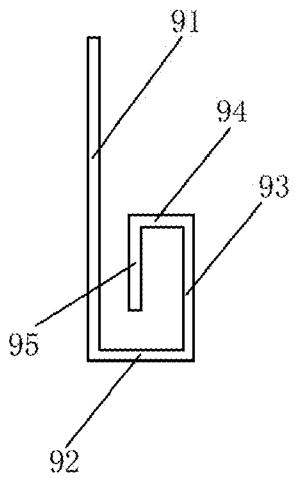
FIG. 10 is a schematic view of one of top-view structures of a bending line in a phase shifter provided in an embodiment of the disclosure.

In one of exemplary embodiments, as further shown in FIG. 10, the orthographic projection of the bending line 90 on the second substrate 20 includes a first strip-shaped structure 91, a second strip-shaped structure 92, a third strip-shaped structure 93, a fourth strip-shaped structure 94 and a fifth strip-shaped structure 95 connected in sequence, and a "6"-shaped structure is enclosed by the first strip-shaped structure 91, the second strip-shaped structure 92, the third strip-shaped structure 93, the fourth strip-shaped structure 94, and the fifth strip-shaped structure 95. In the exemplary embodiment, although the size of the phase shifter can be increased to a certain extent, the bending line 90 is easier to design and simpler in processing and production.

Figure 11:
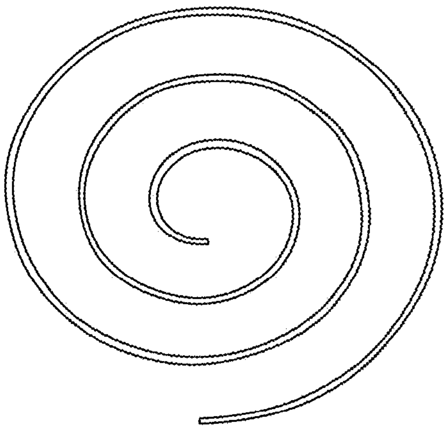
FIG. 11 is a schematic view of one of top-view structures of a bending line in a phase shifter provided in an embodiment of the disclosure.

In one of exemplary embodiments, as further shown in FIG. 11, the orthographic projection of the bending line 90 on the second substrate 20 includes at least one circle of annular structure spirally disposed. In the exemplary embodiment, although the bending line 90 is complex in design and difficult to process and produce, the size of the phase shifter can be reduced to a certain extent.

In the embodiment of the disclosure, as further shown in FIG. 6, the phase shifter further includes a grounding electrode 100 located on a side, close to the third substrate 50, of the second substrate 20, and orthographic projections of the first electrode 51 and the second electrode 52 on the second substrate 20 completely fall within a range of an orthographic projection of the grounding electrode 100 on the second substrate 20.

During specific implementation, the phase shifter further includes the grounding electrode 100 located on the side of the second substrate 20 which is close to the third substrate 50. The first electrode 51, the second electrode 52 and the grounding electrode 100 can be made of a metal material, such as copper, gold and silver, with low resistance and low power consumption, and can be prepared in a way of magnetron sputtering, thermal evaporation and electroplating during actual preparation. In one of exemplary embodiments, the corresponding electrodes can be prepared according to required thicknesses of the corresponding electrodes, and detailed descriptions of specific implementation processes thereof will be omitted herein. In addition, thicknesses of metal film layers corresponding to the first electrode 51, the second electrode 52 and the grounding electrode 100 are greater than corresponding skin depths. The skin depths are $$\sqrt{\frac{2}{\omega\mu\gamma}},$$

ω represents an angular frequency, μ represents a magnetic conductivity, and γ represents an electric conductivity. Moreover, the orthographic projections of the first electrode 51 and the second electrode 52 on the second substrate 20 completely fall within the range of the orthographic projection of the grounding electrode 100 on the second substrate 20.

Figure 12:
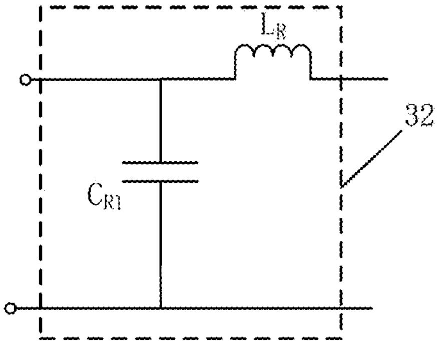
FIG. 12 is a view of one of equivalent circuits of a right-handed microstrip unit in a phase shifter provided in an embodiment of the disclosure.
Figure 13:
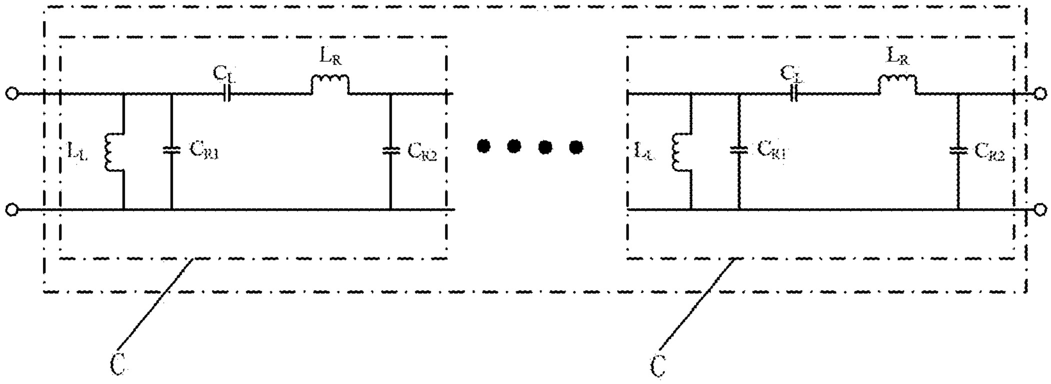
FIG. 13 is a view of one of equivalent circuits of a phase shifter provided in an embodiment of the disclosure.

In the embodiment of the disclosure, as shown in FIG. 12 and FIG. 13, wherein FIG. 12 is a view of one of equivalent circuits of each of the right-handed microstrip units 32, FIG. 13 is a view of one of equivalent circuits of the phase shifter, and block diagram C represents a view of an equivalent circuit corresponding to one of the phase shifting units 30. Specifically speaking, each of the right-handed microstrip units 32 includes a right-handed series inductor $L_R$ connected in series to the corresponding left-handed microstrip unit 33 and a right-handed parallel capacitor $C_{R1}$ connected in parallel to the right-handed series inductor $L_R$, wherein the right-handed series inductor $L_R$ is connected in series to the left-handed series capacitor $C_L$, and the right-handed parallel capacitor $C_{R1}$ is connected in parallel to the left-handed parallel inductor $L_L$. It should be noted that every two adjacent phase shifting units 30 are spaced for a certain distance, thereby forming a certain capacitor shown as $C_{R2}$ in FIG. 13.

In the embodiment of the disclosure, as further shown in FIG. 6, an adjustable medium layer 110 is further disposed between the second electrode 52 and the grounding electrode 100, each of the right-handed parallel capacitors $C_{R1}$ consists of the corresponding second electrode 52, the adjustable medium layer 110, and the grounding electrode 100, and each of the right-handed series inductors $L_R$ consists of the corresponding right-handed microstrip unit 32.

During specific implementation, the adjustable medium layer 110 may be a liquid crystal layer made of a liquid crystal material, and may also be a film layer made of a graphene material. Particularly, when the adjustable medium layer 110 is the liquid crystal layer, the advantages that the phase shifter has a low profile and is easily integrated with other microwave devices and circuits are ensured, and the practicability is improved. In one of exemplary embodiments, the adjustable medium layer 110 may be a polymer dispersed liquid crystal (PDLC), thereby prolonging the response time of the phase shifter. During actual applications, the thickness of the liquid crystal layer has a certain impact on a coupling strength, and therefore, the thickness of the liquid crystal layer should not be too large. In one of exemplary embodiments, the thickness of the liquid crystal layer may be eight point six micrometers. It should be noted that adjustable dielectric constants of different types of liquid crystals are different, and an appropriate liquid crystal can be selected according to a required dielectric constant. In one of exemplary embodiments, a liquid crystal LC446 can be adopted. Of course, the adjustable medium layer 110 can be made of other media with adjustable dielectric constants, which is not limited herein. In addition, each of the right-handed parallel capacitors $C_{R1}$ consists of the corresponding second electrode 52, the adjustable medium layer 110, and the grounding electrode 100, and each of the right-handed series inductors $L_R$ consists of the corresponding right-handed microstrip unit 32.

It should be noted that, during actual preparation of the phase shifter, a left and right hand balance condition needs to be satisfied, that is, a left-handed impedance $Z_L=\sqrt{L_L/C_L}$ is equal to a right-handed impedance $Z_R=\sqrt{L_R/C_R}$, and thus, it is ensured that there is no stop band between a left-handed frequency band and a right-handed frequency band of the combined left-handed and right-handed transmission line 40. With the equivalent circuit shown in FIG. 13 as an example, Z represents a series impedance of single phase shifting unit 30, Y1 and Y2 represent a parallel admittance of the single phase shifting unit 30, β represents a phase shifting constant of the single phase shifting unit 30, and then, the following expression can be achieved as:

$$Z = jwL_R + \frac{1}{jwC_L}$$

$$Y1 = jwC_{R1} + \frac{1}{jwL_L}$$

$$Y2 = jwC_{R2}$$

according to periodic boundary conditions, an expression of the phase shifting constant of the corresponding phase shifting unit 30 can be achieved as:

$$\beta = \frac{1}{p}\cos^{-1}\left[1 + \frac{Z(Y1 + Y2)}{2}\right].$$

Figure 14:
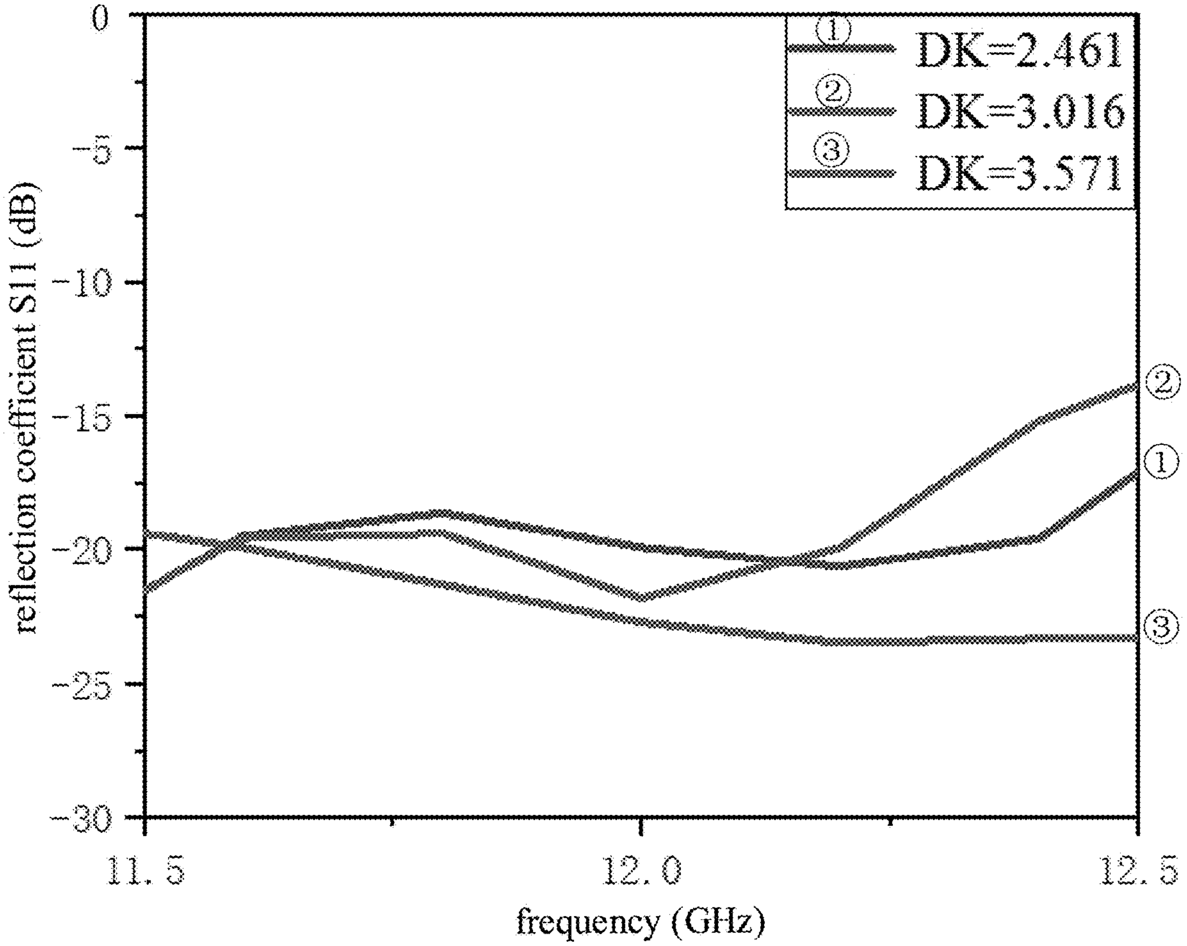
FIG. 14 is a schematic view of a reflection coefficient S11 of a phase shifter including eleven phase shifting units provided in an embodiment of the disclosure.
Figure 15:
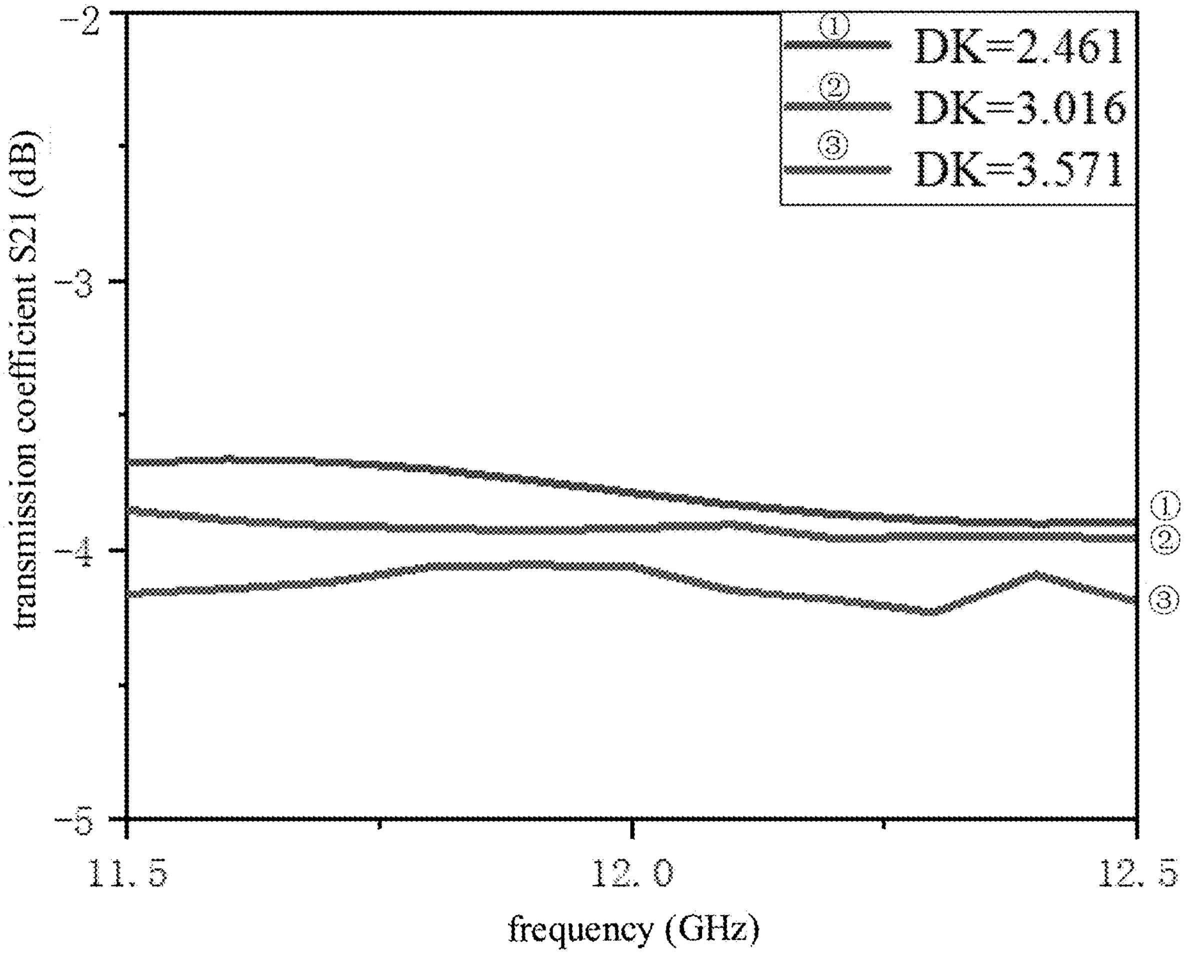
FIG. 15 is a schematic view of a transmission coefficient S21 of a phase shifter including eleven phase shifting units provided in an embodiment of the disclosure.
Figure 16:
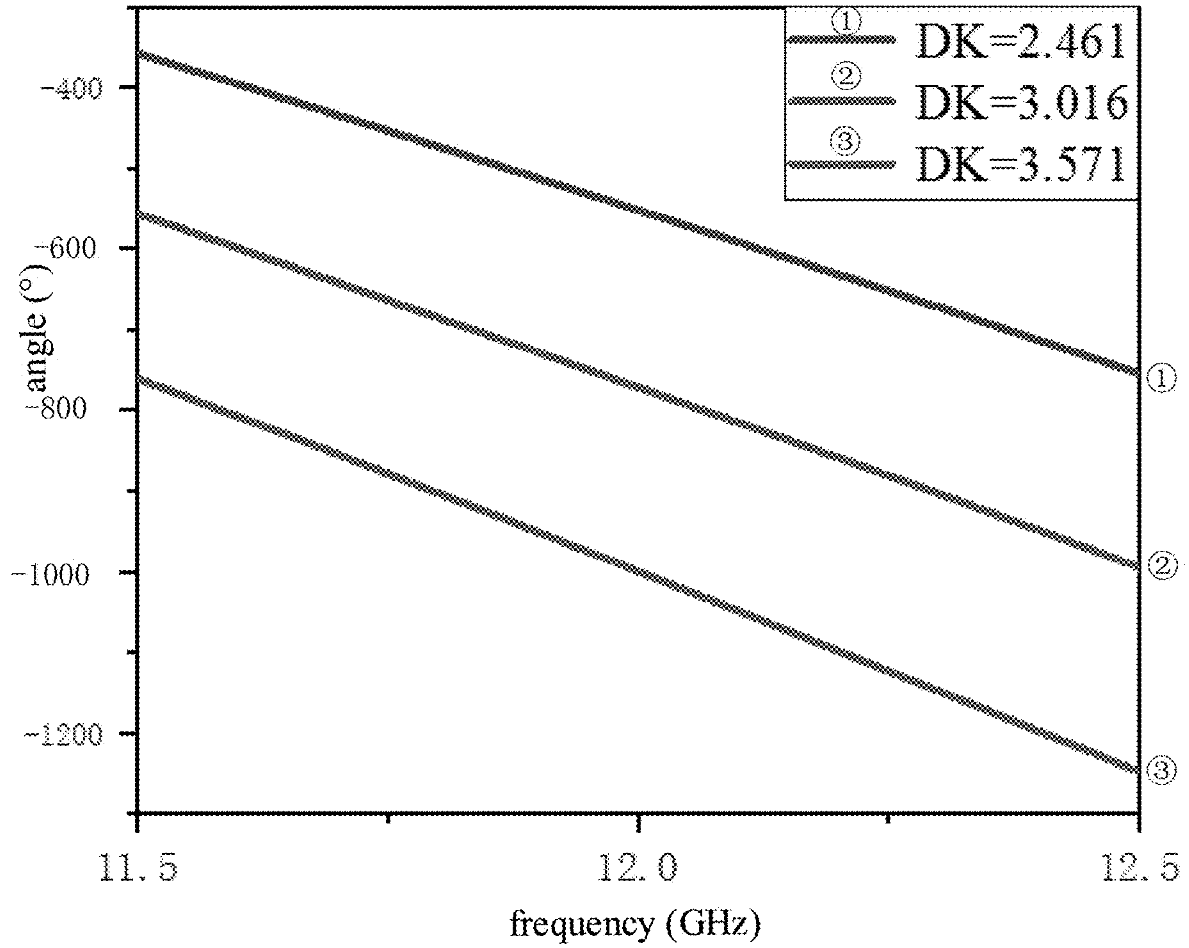
FIG. 16 is a schematic view of a phase shifting magnitude of a phase shifter including eleven phase shifting units provided in an embodiment of the disclosure.

It is found by the inventor that, by adopting the phase shifter provided in the embodiment of the disclosure, with a phase shifter including eleven phase shifting units 30 as an example, a schematic view of a reflection coefficient S11 thereof is shown as FIG. 14, wherein the horizontal axis represents a frequency, the longitudinal axis represents the reflection coefficient S11, and it can be seen that the reflection coefficient S11 of the phase shifter in a working frequency band is smaller than negative fifteen decibels; a schematic view of a transmission coefficient S21 of the phase shifter is shown as FIG. 15, wherein the horizontal axis represents a frequency, the longitudinal axis represents the transmission coefficient S21, and it can be seen that the insertion loss of the phase shifter is lower than negative four point one five decibels; and a phase shifting magnitude of the phase shifter is shown as FIG. 16, wherein the horizontal axis represents a frequency, the longitudinal axis represents an angle, and it can be seen that the phase shifting magnitude of the phase shifter at a center frequency can reach up to four hundred and forty degrees.

Figure 17:
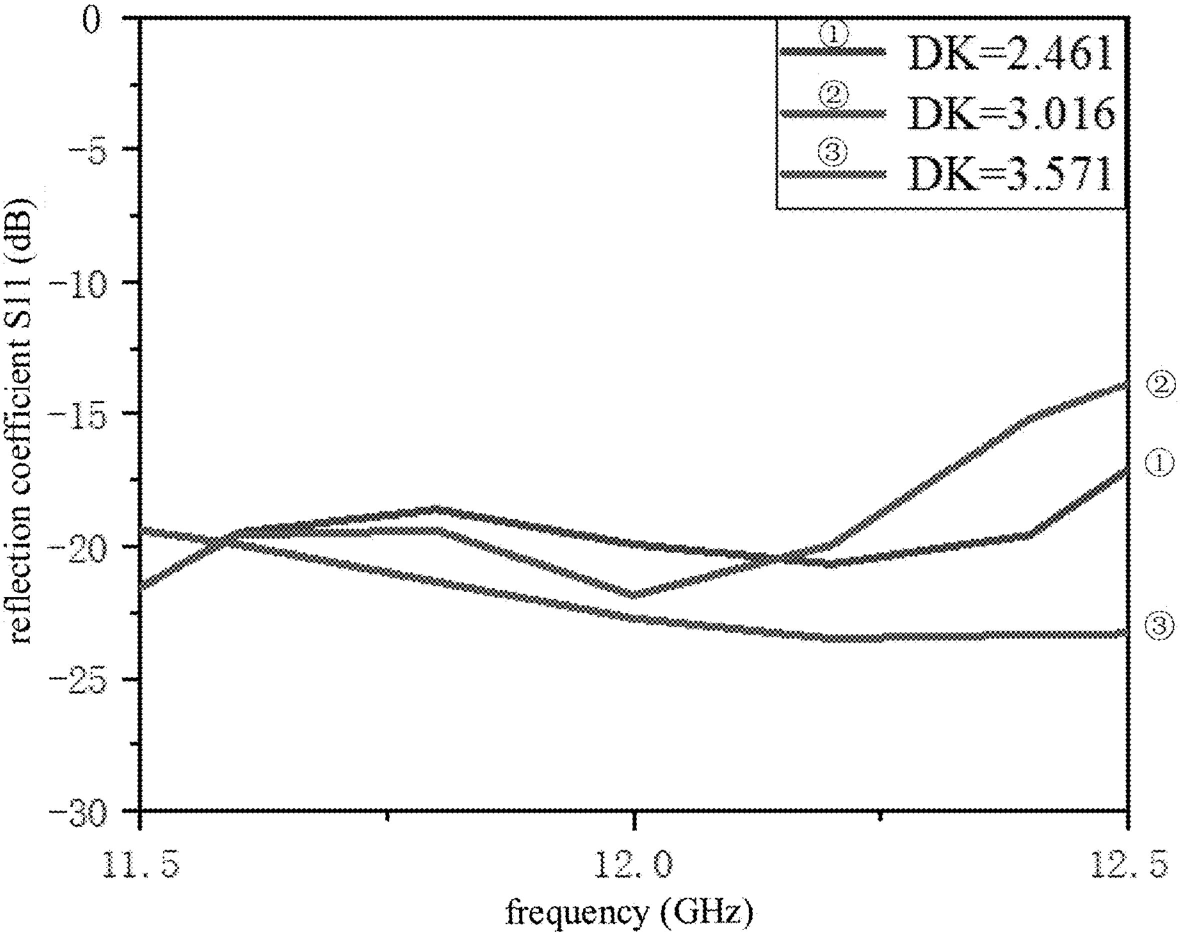
FIG. 17 is a schematic view of a reflection coefficient S11 of a phase shifter including nine phase shifting units provided in an embodiment of the disclosure.
Figure 18:
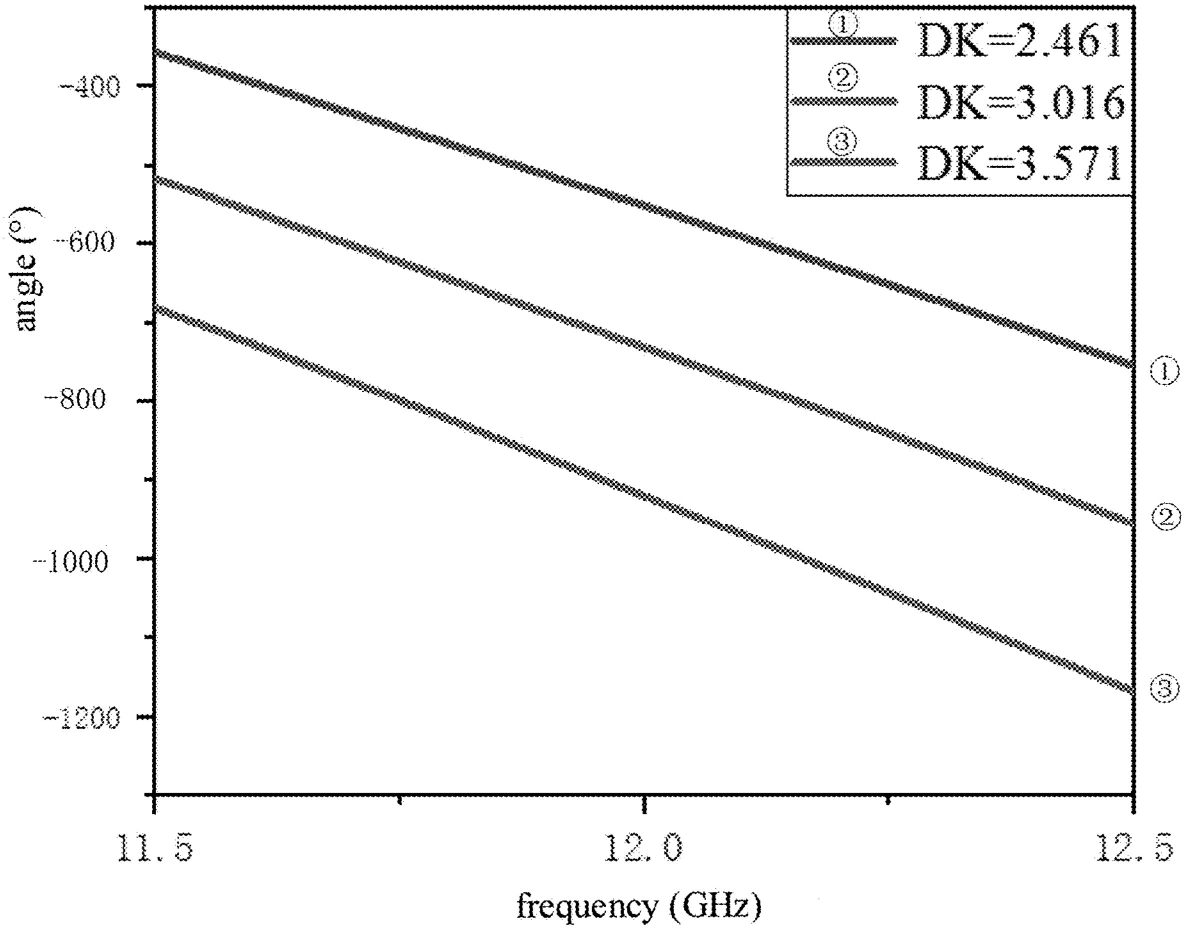
FIG. 18 is a schematic view of a phase shifting magnitude of a phase shifter including nine phase shifting units provided in an embodiment of the disclosure.

With a phase shifter including nine phase shifting units 30 as an example, a schematic view of a reflection coefficient S11 thereof is shown as FIG. 17, and it can be seen that the reflection coefficient S11 of the phase shifter in a working frequency band is smaller than negative fifteen decibels; and a phase shifting magnitude of the phase shifter is shown as FIG. 18, wherein the horizontal axis represents a frequency, the longitudinal axis represents an angle, and it can be seen that the phase shifting magnitude of the phase shifter at a center frequency can reach up to three hundred and sixty degrees.

Figure 19:
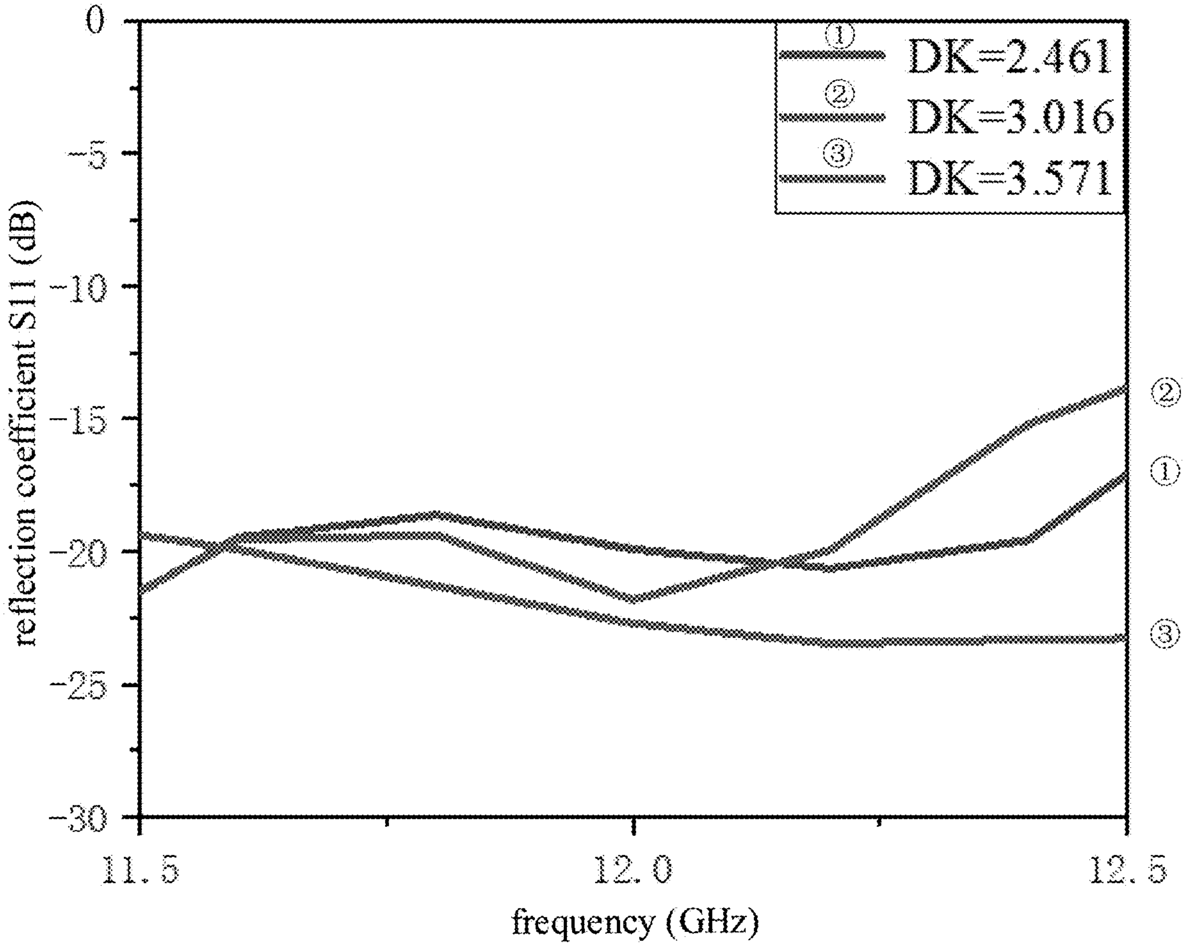
FIG. 19 is a schematic view of a reflection coefficient S11 of a phase shifter including seven phase shifting units provided in an embodiment of the disclosure.
Figure 20:
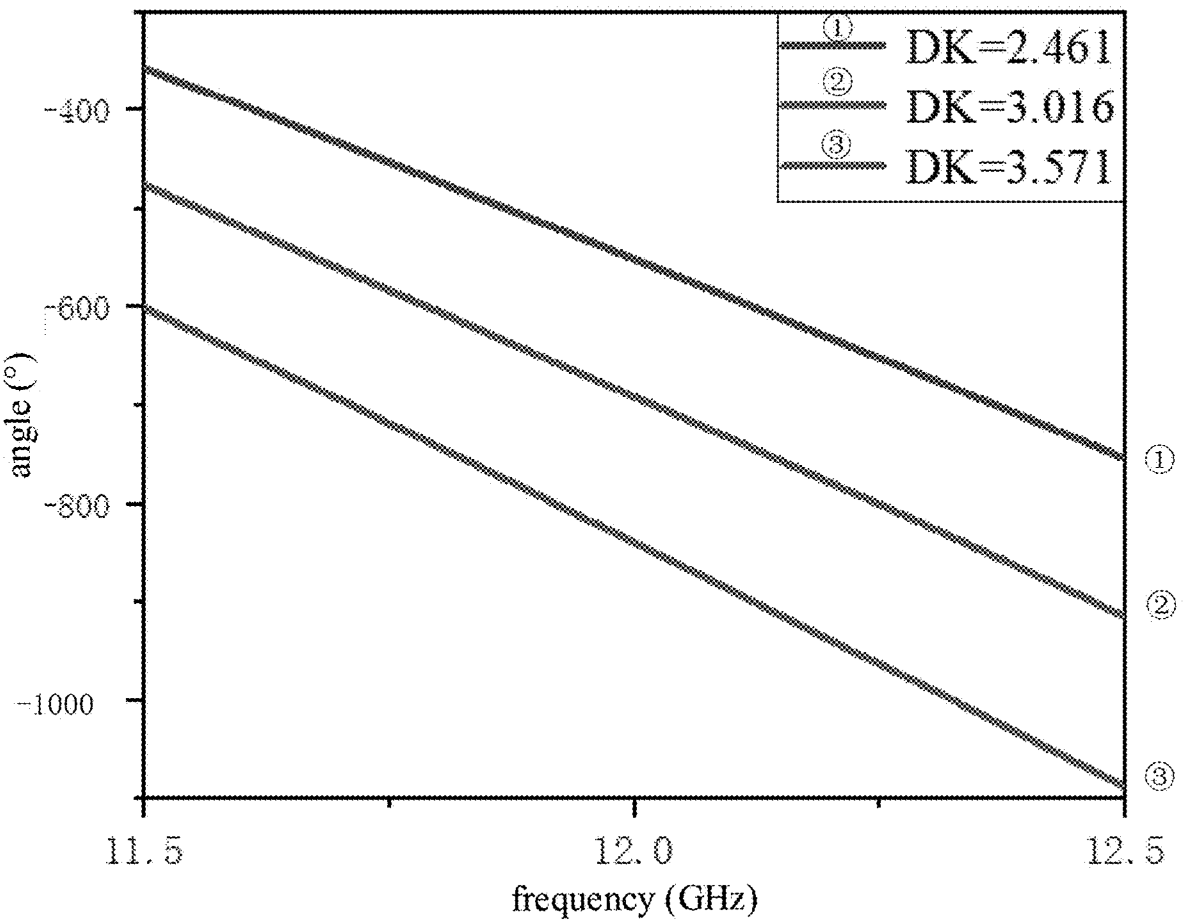
FIG. 20 is a schematic view of a phase shifting magnitude of a phase shifter including seven phase shifting units provided in an embodiment of the disclosure.

With a phase shifter including seven phase shifting units 30 as an example, a schematic view of a reflection coefficient S11 thereof is shown as FIG. 19, and it can be seen that the reflection coefficient of the phase shifter in a working frequency band is smaller than negative fifteen decibels; and a phase shifting magnitude of the phase shifter is shown as FIG. 20, wherein the horizontal axis represents a frequency, the longitudinal axis represents an angle, and it can be seen that the phase shifting magnitude of the phase shifter at a center frequency can reach up to two hundred and eighty degrees. By comparing FIG. 14, FIG. 17 and FIG. 19, it can be known that the situation of impedance mismatching cannot occur by changing the quantity of phase shifting units 30 of a liquid crystal phase shifter of the combined left-handed and right-handed transmission line 40, for example, increasing the quantity of the phase shifting units 30; and for another example, reducing the quantity of the phase shifting units 30. It should be noted that DK in the relevant accompanying drawings represents the dielectric constant of the adjustable medium layer 110.

During actual applications, the phase shifting range of the phase shifter can be changed by changing the quantity of the phase shifting units 30 on the premise that no impedance mismatching occurs, thereby ensuring the flexible design of the phase shifter. The quantity of the phase shifting units 30 included by the phase shifter can be adjusted according to an actual situation, and is not limited herein.

It should be noted that patterns of relevant metal film layers can be manufactured on the first substrate 10, the second substrate 20, and the third substrate 50, respectively; and a specific manufacturing process can adopt implementations in the related art, and the detailed descriptions thereof will be omitted herein. Then, all the substrates are aligned and pressed together; with the adjustable medium layer 110 in the phase shifter being the liquid crystal as an example, the liquid crystal is filled; and then, cutting is performed to obtain a phase shifter with a required size.

Figure 21:
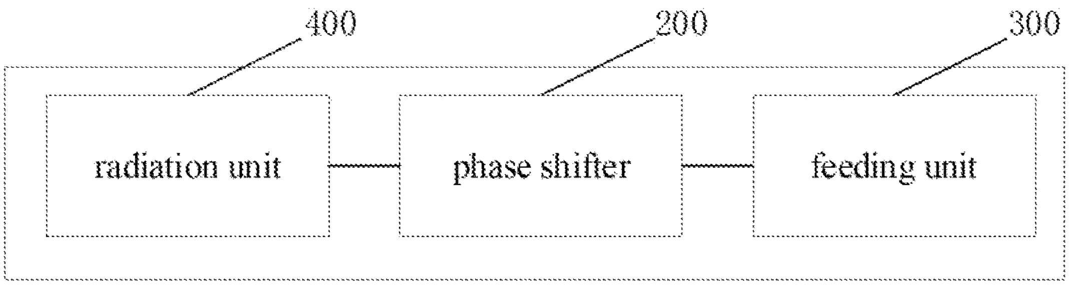
FIG. 21 is a block view of one of structures of an antenna provided in an embodiment of the disclosure.

Based on the same concept of the disclosure, as shown in FIG. 21, an embodiment of the disclosure further provides an antenna, wherein the antenna includes:

the phase shifter 200 according to any one mentioned above as well as a feeding unit 300 and a radiation unit 400 which are respectively coupled to the phase shifter 200; and the feeding unit 300 is configured to couple a received radio frequency signal to the phase shifter 200, the phase shifter 200 is configured to perform phase shifting on the radio frequency signal to obtain a phase-shifted signal and couple the phase-shifted signal to the radiation unit 400 so that an electromagnetic wave signal corresponding to the phase-shifted signal is radiated by the radiation unit 400.

During specific implementation, a specific structure of the phase shifter 200 in the antenna provided in the embodiment of the disclosure can refer to the description for the aforementioned relevant part. The principle of the antenna to solve a problem is similar to that of the aforementioned phase shifter 200, and therefore, the implementation of the antenna can refer to that of the aforementioned phase shifter 200, and the repeated description thereof will be no longer repeated.

The antenna provided in the embodiment of the disclosure further includes the feeding unit 300 and the radiation unit 400 which are respectively coupled to the phase shifter 200, wherein the feeding unit 300 is configured to couple the received radio frequency signal to the phase shifter 200, in this case, the phase shifter 200 can perform phase shifting on the radio frequency signal, thereby obtaining the phase-shifted signal. Then, the phase shifter 200 can couple the phase-shifted signal to the radiation unit 400. Subsequently, the electromagnetic wave signal corresponding to the phase-shifted signal can be radiated by the radiation unit 400, and thus, a communication function of the antenna is achieved.

Figure 22:
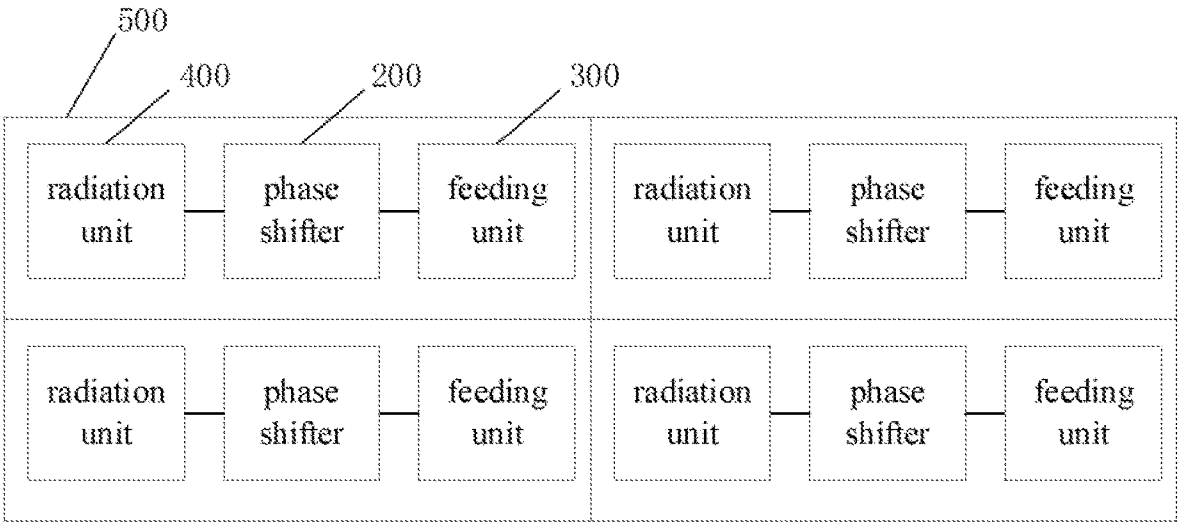
FIG. 22 is a block view of one of structures of an electronic device provided in an embodiment of the disclosure.

Based on the same concept of the disclosure, as shown in FIG. 22, an embodiment of the disclosure further provides an electronic device, wherein the electronic device includes the arrayed antenna 500.

The principle of the electronic device to solve a problem is similar to that of the aforementioned phase shifter, and therefore, the implementation of the electronic device can refer to that of the aforementioned phase shifter, and the repeated description thereof will be no longer repeated.

During specific implementation, the electronic device provided in the embodiment of the disclosure may be any product or component with a display function, such as a mobile phone, a tablet personal computer, a television, a display, a notebook computer, a digital photo frame, and a navigator. Other essential components of the electronic device should be those provided to the understanding of those of ordinary skill in the art, and they will not be repeated herein and should not be taken as a limitation to the disclosure, either.

Although the preferred embodiments of the disclosure have been described, those skilled in the art can make additional changes and modifications on these embodiments once they acquire the basic creative concept. Therefore, appended claims are intended to be explained to include the preferred embodiments and all the changes and modifications that fall within the scope of the disclosure.

Obviously, those skilled in the art can make various modifications and variations to the present application without departing from the spirit and scope of the present application. Thus, if such modifications and variations of the present application fall within the scope of the claims of the present application and the equivalent technologies thereof, the present application is also intended to cover such modifications and variations.

The invention claimed is:

1. A phase shifter comprising:

a first substrate and a second substrate which are disposed opposite to each other; and a plurality of phase shifting units disposed between the first substrate and the second substrate, wherein each of the phase shifting units comprises a right-handed microstrip unit, the plurality of right-handed microstrip units are arranged in a first direction to form a right-handed microstrip line, each of the phase shifting units comprises a left-handed microstrip unit connected in series to the corresponding right-handed microstrip unit, and the plurality of right-handed microstrip units and the plurality of left-handed microstrip units form a combined left-handed and right-handed transmission line;

wherein each of the left-handed microstrip units comprises a left-handed series capacitor connected in series to the corresponding right-handed microstrip unit and a left-handed parallel inductor connected in parallel to the left-handed series capacitor;

wherein the phase shifter further comprises a third substrate located between the first substrate and the second substrate, each of the left-handed series capacitors comprises a first electrode located on a side, close to the third substrate, of the first substrate and a second electrode located on a side, away from the first substrate, of the third substrate, and orthographic projections of the first electrode and the second electrode on the third substrate at least partially overlap.

2. The phase shifter according to claim 1, wherein the side of the first substrate which is close to the third substrate is further provided with a third electrode adjacent to the first electrode, and the third electrode is connected to the second electrode through a via hole passing through the right-handed microstrip unit corresponding to the second electrode.

3. The phase shifter according to claim 2, wherein an orthographic projection of each of the second electrode and the right-handed microstrip unit corresponding to the second electrode on the third substrate comprises a first sub-part, a second sub-part and a third sub-part connected in sequence, the first sub-part and the third sub-part extend in the first direction, and the second sub-part extends in a second direction intersected with the first direction.

4. The phase shifter according to claim 2, wherein each of the left-handed parallel inductors comprises a bending line connected to the second electrode and extending in the second direction intersected with the first direction, and an orthographic projection of the bending line on the second substrate is nonlinear.

5. The phase shifter according to claim 4, wherein the orthographic projection of the bending line on the second substrate comprises at least one rectangular unit repeatedly disposed.

6. The phase shifter according to claim 4, wherein the orthographic projection of the bending line on the second substrate comprises a first strip-shaped structure, a second strip-shaped structure, a third strip-shaped structure, a fourth strip-shaped structure and a fifth strip-shaped structure connected in sequence, and a “6”-shaped structure is formed by the first strip-shaped structure, the second strip-shaped structure, the third strip-shaped structure, the fourth strip-shaped structure, and the fifth strip-shaped structure.

7. The phase shifter according to claim 4, wherein the orthographic projection of the bending line on the second substrate comprises at least one circle of annular structure spirally disposed.

8. The phase shifter according to claim 1, wherein the phase shifter further comprises a grounding electrode located on a side, close to the third substrate, of the second substrate, and orthographic projections of the first electrode and the second electrode on the second substrate completely fall within a range of an orthographic projection of the grounding electrode on the second substrate.

9. The phase shifter according to claim 8, wherein each of the right-handed microstrip units comprises a right-handed series inductor connected in series to the corresponding left-handed microstrip unit and a right-handed parallel capacitor connected in parallel to the right-handed series inductor, wherein the right-handed series inductor is connected in series to the left-handed series capacitor, and the right-handed parallel capacitor is connected in parallel to the left-handed parallel inductor.

10. The phase shifter according to claim 9, wherein an adjustable medium layer is further disposed between the second electrode and the grounding electrode, each of the right-handed parallel capacitors includes the corresponding second electrode, the adjustable medium layer, and the grounding electrode, and each of the right-handed series inductors includes the corresponding right-handed microstrip unit.

11. An antenna comprising:

the phase shifter according to claim 1, and a feeding unit and a radiation unit which are respectively coupled to the phase shifter; and the feeding unit is configured to couple a received radio frequency signal to the phase shifter, the phase shifter is configured to perform phase shifting on the radio frequency signal to obtain a phase-shifted signal and couple the phase-shifted signal to the radiation unit so that an electromagnetic wave signal corresponding to the phase-shifted signal is radiated by the radiation unit.

12. An electronic device comprising:

antennas according to claim 11 that are arranged in an array.

13. The antenna according to claim 11, wherein the side of the first substrate which is close to the third substrate is further provided with a third electrode adjacent to the first electrode, and the third electrode is connected to the second electrode through a via hole passing through the right-handed microstrip unit corresponding to the second electrode.

14. The antenna according to claim 11, wherein the phase shifter further comprises a grounding electrode located on a side, close to the third substrate, of the second substrate, and orthographic projections of the first electrode and the second electrode on the second substrate completely fall within a range of an orthographic projection of the grounding electrode on the second substrate.

15. The antenna according to claim 13, wherein an orthographic projection of each of the second electrode and the right-handed microstrip unit corresponding to the second electrode on the third substrate comprises a first sub-part, a second sub-part and a third sub-part connected in sequence, the first sub-part and the third sub-part extend in the first direction, and the second sub-part extends in a second direction intersected with the first direction.

16. The antenna according to claim 13, wherein each of the left-handed parallel inductors comprises a bending line connected to the second electrode and extending in the second direction intersected with the first direction, and an orthographic projection of the bending line on the second substrate is nonlinear.

17. The antenna according to claim 16, wherein the orthographic projection of the bending line on the second substrate comprises at least one rectangular unit repeatedly disposed.

18. The antenna according to claim 16, wherein the orthographic projection of the bending line on the second substrate comprises a first strip-shaped structure, a second strip-shaped structure, a third strip-shaped structure, a fourth strip-shaped structure and a fifth strip-shaped structure connected in sequence, and a "6"-shaped structure is formed by the first strip-shaped structure, the second strip-shaped structure, the third strip-shaped structure, the fourth strip-shaped structure, and the firth strip-shaped structure.

19. The antenna according to claim 16, wherein the orthographic projection of the bending line on the second substrate comprises at least one circle of annular structure spirally disposed.

* * * * *